(12) United States Patent
Vallee

(10) Patent No.: US 6,205,142 B1
(45) Date of Patent: Mar. 20, 2001

(54) INVERSE MULTIPLEXING OF DIGITAL DATA

(75) Inventor: Richard Vallee, Gatineau (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 08/909,060

(22) Filed: Aug. 14, 1997

Related U.S. Application Data

(60) Provisional application No. 60/024,023, filed on Aug. 16, 1996.

(51) Int. Cl.[7] ............................... H04J 3/02; H04L 12/56
(52) U.S. Cl. ..................... 370/394; 370/395; 370/471; 370/536
(58) Field of Search .................................... 370/389, 394, 370/395, 400, 408, 465, 470, 471, 474, 476, 477, 506, 536, 542, 543, 544

(56) References Cited

U.S. PATENT DOCUMENTS

| | | | |
|---|---|---|---|
| 5,285,441 | * 2/1994 | Bansal et al. | 370/228 |
| 5,608,733 | 3/1997 | Vallee et al. | 370/394 |
| 5,617,417 | * 4/1997 | Sathe et al. | 370/394 |
| 5,875,192 | * 2/1999 | Cam et al. | 370/474 |
| 5,970,067 | * 10/1999 | Sathe et al. | 370/394 |

FOREIGN PATENT DOCUMENTS

| | | |
|---|---|---|
| 0 584 398 | 3/1994 | (EP) . |
| 96/08120 | 3/1996 | (WO) . |
| 96/17489 | 6/1996 | (WO) . |

OTHER PUBLICATIONS

Palmer, "Inverse Multiplexing of ATM Cells Over Low Speed UNI's Such as T1 and E1", (1994).
Sathe, "ATM Inverse Multiplexing Mechanism", (1994).

\* cited by examiner

*Primary Examiner*—Alpus H. Hsu
(74) *Attorney, Agent, or Firm*—Finnegan, Henderson, Farabow, Garrett & Dunner, L.L.P.

(57) ABSTRACT

In ATM networks, digital data in ATM cells are sent to a destination node over more than one transmission link in round robin fashion. This is called inverse multiplexing. At connection start-up, the source node informs the destination node of the specific round robin fashion of the transmission links so that the ATM cells are reassembled in a proper sequential order. Inverse multiplexing control cells are used to communicate between the source node and destination node for connectivity testing of transmission links. Cell stuffing is also provided in one embodiment to accommodate non-synchronized links among transmission links. In a particular embodiment, two consecutive control cells indicate a stuffing cell. A start-up procedure is described when not all the transmission links are usable.

74 Claims, 14 Drawing Sheets

| OCTET | FIELD |
|---|---|
| 1-5 | ATM CELL HEADER |
| 6 | IMA LABEL |
| 7 | CELL ID, LINK ID |
| 8 | IMA FRAME SEQUENCE NUMBER |
| 9 | ICP CELL OFFSET |
| 10 | LINK STUFF INDICATION |
| 11 | STATUS & CONTROL CHANGE INDICATION |
| 12 | Tx IMA ID |
| 13 | Rx IMA ID |
| 14 | GROUP STATUS & CONTROL |
| 15 | Tx TEST CONTROL |
| 16 | Tx TEST PATTERN |
| 17 | Rx TEST PATTERN |
| 18 | LINK 0 INFORMATION |
| 19 | LINK 1 INFORMATION |
| 20-49 | LINK 2-31 INFORMATION |
| | |
| | |
| | |
| 50-51 | UNUSED |
| 52-53 | CRC-10 |

| CELL PURPOSE | OCTET 1 | OCTET 2 | OCTET 3 | OCTET 4 | OCTET 5 |
|---|---|---|---|---|---|
| IDLE CELL IDENTIFICATION | 00000000 | 00000000 | 00000000 | 00000001 | 01010010 |
| CELL-BASED INTERFACE F1 OAM CELL | 00000000 | 00000000 | 00000000 | 00000011 | 01011100 |
| CELL-BASED INTERFACE F3 OAM CELL | 00000000 | 00000000 | 00000000 | 00001001 | 01101000 |

FIG. 5

| OCTET 1 | OCTET 2 | OCTET 3 | OCTET 4 | OCTET 5 (HEC) |
|---|---|---|---|---|
| 00000000 | 00000000 | 00000000 | 00001111 | 11001011 |

FIG. 6

| OCTET | ALLOCATION |
|---|---|
| 1 | AIM-RDI |
| 2 | AIMFERR |
| 3 | AIMCSN(MSB) |
| 4 | AIMCSN(LSB) |
| 5 | R |
| 6 | R |
| 7 | R |
| 8 | R |
| 9 | R |
| 10 | R |
| 11 | R |
| 12 | R |
| 13 | R |
| 14 | R |
| 15 | R |
| 16 | R |
| 17 | R |
| 18 | R |
| 19 | R |
| 20 | R |
| 21 | R |
| 22 | R |
| 23 | R |
| 45 | R |
| 46 | R |
| 47 | R |
| 48 | CEC (10) |

MSB: MOST SIGNIFICANT BYTE

LSB: LEAST SIGNIFICANT BYTE

*FIG. 7*

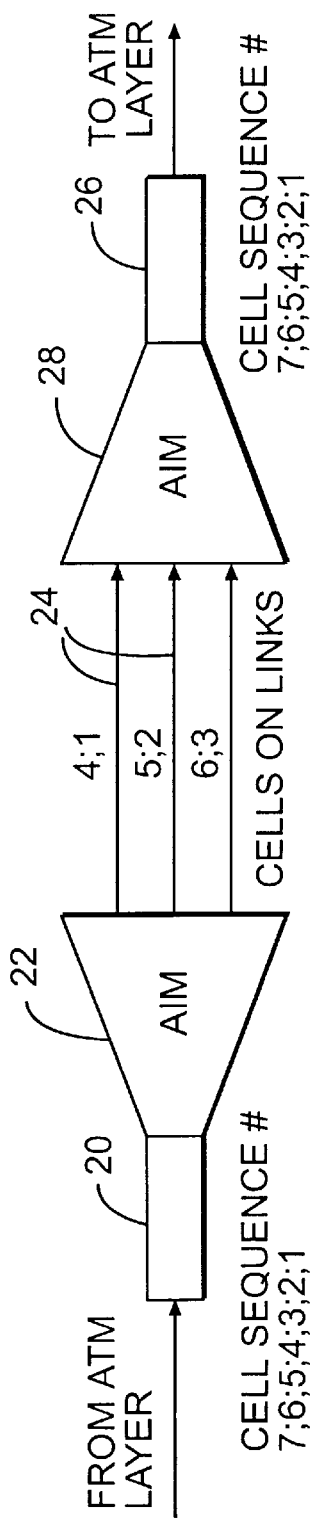
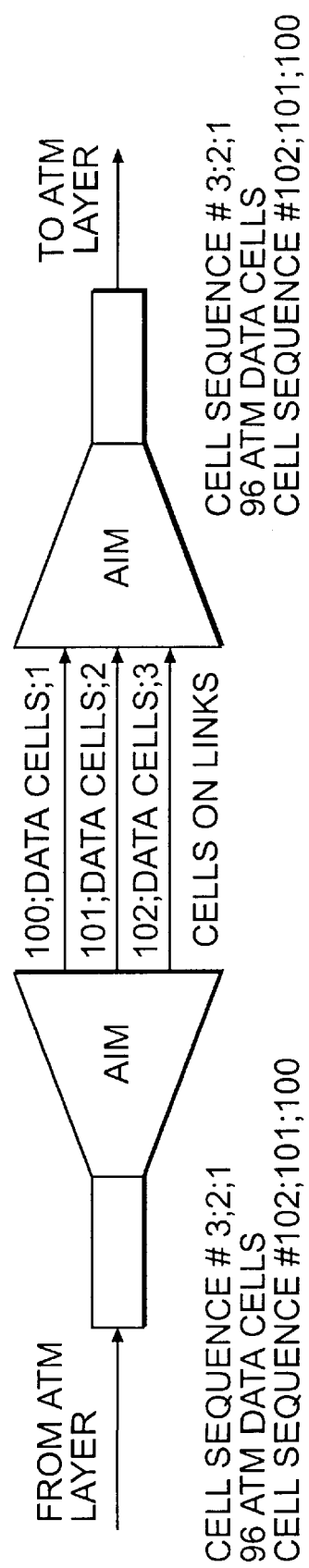

| OCTET | FIELD |
|---|---|
| 1-5 | ATM CELL HEADER |
| 6 | IMA LABEL |
| 7 | CELL ID, LINK ID |
| 8 | IMA FRAME SEQUENCE NUMBER |
| 9 | ICP CELL OFFSET |
| 10 | LINK STUFF INDICATION |
| 11 | STATUS & CONTROL CHANGE INDICATION |
| 12 | Tx IMA ID |
| 13 | Rx IMA ID |
| 14 | GROUP STATUS & CONTROL |
| 15 | Tx TEST CONTROL |
| 16 | Tx TEST PATTERN |
| 17 | Rx TEST PATTERN |
| 18 | LINK 0 INFORMATION |
| 19 | LINK 1 INFORMATION |
| 20-49 | LINK 2-31 INFORMATION |
| | |
| | |
| | |
| 50-51 | UNUSED |
| 52-53 | CRC-10 |

*FIG. 10*

INVERSE MULTIPLEXING OF DIGITAL DATA

This application claims benefit to U.S. provisional 60/024,023 filed Aug. 26, 1996.

FIELD OF THE INVENTION

The invention relates to a new mechanism for sending ATM cells transparently over multiple slower transmission links. In particular, the invention is directed to a method of inverse multiplexing of a series of ATM cells transparently over N transmission links (N being a positive integer) of slower speed.

BACKGROUND OF THE INVENTION

It has been recognized that the T1/E1 rate (1.544/2.048 Mbit/s) is a cost effective way of user access to an ATM network as well as connection between ATM network switches. However, as ATM technology for wide area networks is deployed more and more, demands for transmission links of a rate higher than T1/E1 are increasing. Links of higher rates, such as T3/E3 (44.736/34.368 Mbit/s), have been designed to meet these needs. However, the cost of T3/E3 links is still prohibitive in many cases and the ratio of cost versus realistic utilization of the entire rate is not always attractive and fully justified for new ATM end users and service providers. ATM inverse multiplexers (AIMs) have been proposed to satisfy the need by using multiple T1/E1 links which are grouped collectively to provide the service at a higher rate.

FIG. 1 and FIG. 2 show two sample configurations in which AIMs are used. FIG. 1 depicts a user access to a network through user network interfaces (UNIs) and FIG. 2 a link connection between ATM switches through broadband inter-carrier interfaces (BICIs) or private network to network interfaces (PNNIs).

Referring to the figures, the basic function of AIMs is to work in pairs to take an ATM cell stream coming from the ATM layer, send it over the multiple links by spreading cells over the available links and ensure that the initial cell stream can be retrieved at the far end. Thus the AIMs preferably make the ATM traffic transparent to the ATM layer over multiple links which connect them. As far as the ATM layer is concerned, it should only see a pipe whose rate is now the sum of the multiple link rates. It is assumed that each link is run in clear-mode without the presence of intermediate ATM nodes processing ATM cells. This means that there should be no cell discard by any intermediate transmission equipment.

Currently no ATM inverse multiplexing protocols have been proposed which can properly interwork existing ATM inverse multiplexers or other ATM products which are already available on the market, and yet are flexible enough to fit into the current standard ATM specifications. Two proposals for an ATM inverse multiplexing protocol have so far been made and are described in detail below.

New Transmission Convergence Protocol Using GFC Bits

This protocol was presented in "Physical Layer Sub-Working Group ATM Forum/94-0775, ATM Inverse Multiplexing Mechanism", September 1994, by StrataCom Inc. The protocol robs two of the Generic Flow Control (GFC) bits contained in each cell transmitted over the multiple T1/E1 links to implement a new transmission convergence (TC) layer. FIG. 3 shows the ATM cell structure which is defined in the ITU Recommendation. The TC layer is defined by one GFC bit for framing and the other one for link control. The framing bit is used to determine relative link delays while the link control bit is used for communication, control and administration between two TC points at two ends of the inverse multiplexer.

In order to establish the sequence of cells over the links in a round robin manner, one end is defined as being "master" and the other as "slave". The "master" decides and informs the slave about the multiple link configuration using the control channel implemented through the link control bits.

This protocol is only applicable, however, for UNI application points because GFC bits that are robbed to implement the TC layer are only present in a cell defined for UNI. For NNI cells, the corresponding bits are no longer available since they are captured under the VPI field. Service providers are interested in ATM inverse multiplexers for carrying ATM traffic at rates higher than T1/E1 and lower than T3/E3, but this protocol will not satisfy their need. It should also be noted that the protocol calls for a need to identify a "master" and a "slave" TC point and that requires an additional setting to be performed by the network operator.

Bit Pipe Inverse Multiplexing

This protocol was presented in "Physical Layer Sub-Working Group ATM Forum/94-0956, Inverse Multiplexing of ATM cells over low speed UNIs such as T1 and E1", September 1994, by Digital Link Corporation. It proposes a "bit pipe" inverse multiplexing technique requiring the definition of a "bonding" (bandwidth on demand) like specification for N (positive number) T1/E1 inverse multiplexing.

It is not clear in the proposal how both ends of the links exchange information concerning the order of cells to be transferred from one end to another over multiple links. The proposal mentions the existence and deployment of physical layer protocols that perform inverse multiplexing. The inverse multiplexer which can be used in this proposal is presumably the one defined by Digital Link Corporation in their "DL3800 DS1 Inverse Multiplexer Users Manual, 1993".

The inverse multiplexing protocol defined in the above user's manual relies on the definition of an extra bit taken from T1/E1 payload bits to configure the multiple links and adjust differential link delays. This protocol introduces the need for extra processing of data between devices dealing with T1/E1 frames and ATM cell delineation. It also causes the ATM cells to no longer be byte aligned with the DS1/E1 frame. This is a requirement by the ATM Forum UNI DS1/E1 Physical Layer specifications. Changes like this would not be welcome by end users, vendors and service providers who are already using and deploying ATM equipment.

U.S. Pat. No. 5,608,733, Mar. 4, 1997, Vallee et al, describes good ways of obviating the above noted problems. The patent uses ATM sequence number cells indicating a specific round robin order of a plurality of transmission links over which ATM data cells are transmitted. The ATM sequence number cells also indicate whether or not a destination is ready to receive ATM data cells in that specific round robin order.

The present invention extends further variety of functionalities which are useful in inverse multiplexing.

OBJECTS OF THE INVENTION

It is therefore an object of the invention to provide a method of sending ATM traffic over a connection consisting of a plurality of transmission links.

It is another object of the invention to provide a method of sending a series of ATM cells spread over a plurality of transmission links in a specific round robin order.

It is yet another object of the invention to provide a method of sending ATM cells containing sequence numbers therein over a plurality of transmission links in a specific round robin order.

It is a further object of the invention to provide a method of sending a series of ATM cells between ATM inverse multiplexers over a connection consisting of a plurality of transmission links, transparent to the ATM layer.

It is yet another object of the invention to provide a method of sending ATM traffic over a connection which consists of a plurality of transmission links and has been reconfigured after the connection start-up.

It is still another object of the invention to provide an ATM inverse multiplexing method which is applicable to UNIs, BICIs and PNNs.

It is a further object of the invention to provide a method of preserving link integrity by periodically sending sequence number cells.

It is a further object of the invention to provide a method of handling link failure and link reconfiguration.

It is still a further object of the invention to provide a method of stuffing cells to accommodate non-synchronized links.

SUMMARY OF THE INVENTION

Briefly stated, the invention reside in the inverse multiplexing digital data over a connection consisting of a plurality of transmission links, said data containing a series of ATM data cells. According to one aspect, the invention is directed to a method of cell stuffing to prevent underrun in a plesiochronous AIM network.

In accordance with a yet another aspect, the method further includes a step of sending two consecutive inverse multiplexing control cells in a frame, indicating cell stuffing.

According to a further aspect, the invention is directed to a method of inverse multiplexing digital data over a connection consisting of a plurality of transmission links, said data containing a series of ATM data cells. In particular, the method comprises steps of identifying N number of transmission links over which the series of ATM data cells are to be transmitted, N being a positive integer and sending a series of inverse multiplexing control cells indicating a first specific round robin order of the transmission links. The method further includes steps of receiving a series of inverse multiplexing control cells whose receive ready field is set to indicate a second specific round robin order in a group formed by P number out of N transmission links, P being a positive integer smaller than N and finally sending each ATM data cell in said series of ATM data cells in said second specific round robin order.

BRIEF DESCRIPTION OF THE DRAWINGS

For a more complete understanding of the invention and for further objects and advantages thereof, reference may now be made to the following description, taken in conjunction with the accompanying drawings, in which:

FIG. 5 shows preassigned cell header values for use by the physical layer;

FIG. 6 shows a header pattern of an AIM OAM cell, according to one embodiment of the invention;

FIG. 7 indicates allocation of OAM functions in the information field according to one embodiment of the invention;

FIG. 8 is a schematic illustration of multiplexing and demultiplexing of AIM OAM cells according to one embodiment of the invention; and FIG. 9 is a schematic illustration of periodic multiplexing and demultiplexing of AIM OAM cells during transmission of ATM data cells according to one embodiment of the invention.

FIG. 10 is an ICP cell format used for implementing embodiments of the invention.

DETAILED DESCRIPTION OF PREFERRED EMBODIMENTS

There are requirements that have to be considered when defining a new ATM inverse multiplexing protocol. These requirements are:

It must multiplex and demultiplex an ATM cell stream distributed in a round robin manner over multiple links such as T1/E1 links.

It must adjust up to 32 milliseconds of differential link delays between individual links in a case where T1/E1 links are used.

It must reconfigure multiple links in the event that a link has to be added, deleted or is considered inadequate to provide service.

It must be defined for not only UNIs but also for PNNIs and BICIs.

It must be transparent to the devices handling the convergence of ATM cells into the PDH signal.

It must be transparent to the devices dealing with ATM layer cells.

The present invention achieves all of the above requirements and solves the problems discussed earlier. The invention relates to a new ATM inverse multiplexing scheme that makes use of a physical layer operation administration and maintenance (OAM) cell which has been properly defined. This OAM cell is defined to contain valuable information to allow proper operation of the ATM inverse multiplexing mechanism and also to provide opportunity for handling a link failure situation.

The newly defined OAM cell is called an AIM OAM cell or AIM Sequence Number (SN) cell and is mainly designed to carry a cell sequence number and a feedback link status field. The sequence number in the SN cell is made available for the receiver end for recovering the initial cell stream from the incoming links. The feedback link status is made available for the receiver to inform the transmitter, by sending its own SN cells, that it is receiving cells and it is also an integral part of the same round robin mechanism, that is to say, the feedback link status value SN cells in either direction must agree with each other, although the sequence numbers at both ends may be different. When the receiver sends its own SN cells in response to the transmitter that it is receiving cells, it is in fact acknowledging that the receiver is ready to receive subsequent ATM data cells.

Figure 4:
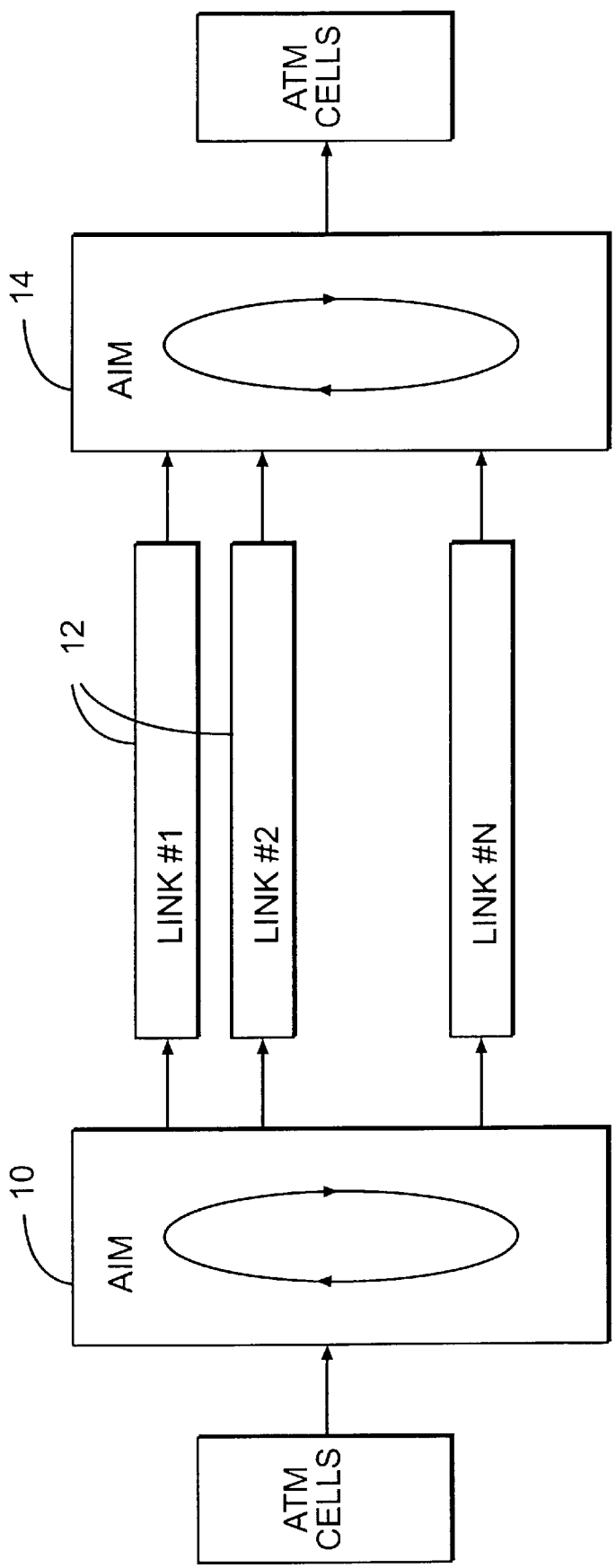
FIG. 4 is a schematic illustration of multiplexing and demultiplexing of ATM cells over AIMs and links.

FIG. 4 shows how the ATM cells are multiplexed and then demultiplexed over AIMs in one direction. At the transmitting node, an AIM 10 takes a series of ATM cells from an ATM layer device. It spreads ATM cells and transmits each cell over each of N transmission links, N being a positive integer. The order of transmission is in round robin fashion. This process is called an inverse multiplexing. At the receiving node, cells from N links are inverse demultiplexed (assembled) and sent to an ATM layer device by an AIM 14. The same order must be employed at this node to recover a proper sequence of cells. Both nodes must be aware of the round robin order which is to be employed. Upon initialization, therefore, both AIMs send a series of SN cells in round robin fashion over the links, e.g. T1/E1 links. This allows the receiver AIM at both nodes to establish the sequence in which to read cells from the incoming links as well as to adjust relative link delay.

As mentioned above, the SN cell also carries an extra field used by each T1/E1 link to indicate that both AIMs belong to the same link round robin. This information can then be used locally to determine if at the corresponding local node a link should be added, removed or maintained in the round robin.

When a change of link configuration occurs by a link being added, removed or declared as being down, each node sends a series of SN cells to allow the far-end node to reestablish the sequence of cells to read from the incoming links.

Figure 1:
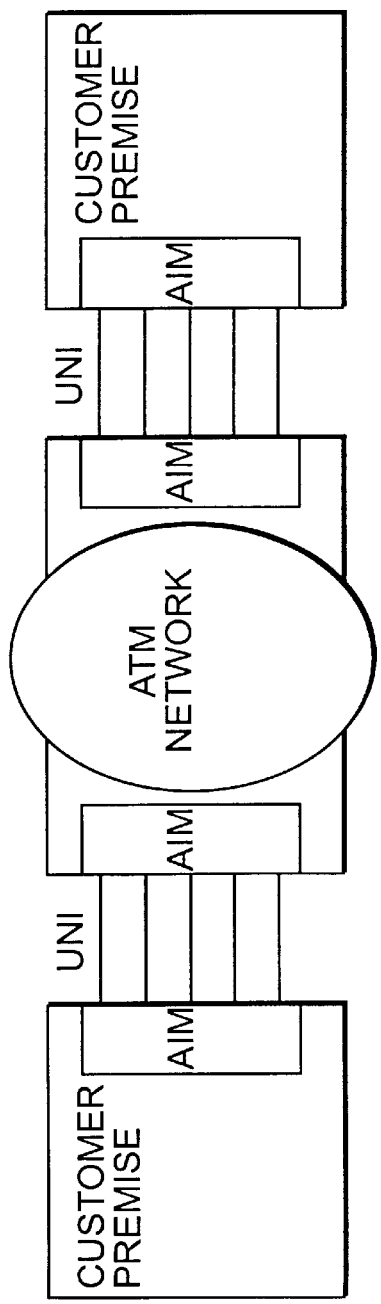
FIG. 1 shows a sample configuration involving AIM UNIs.
Figure 2:
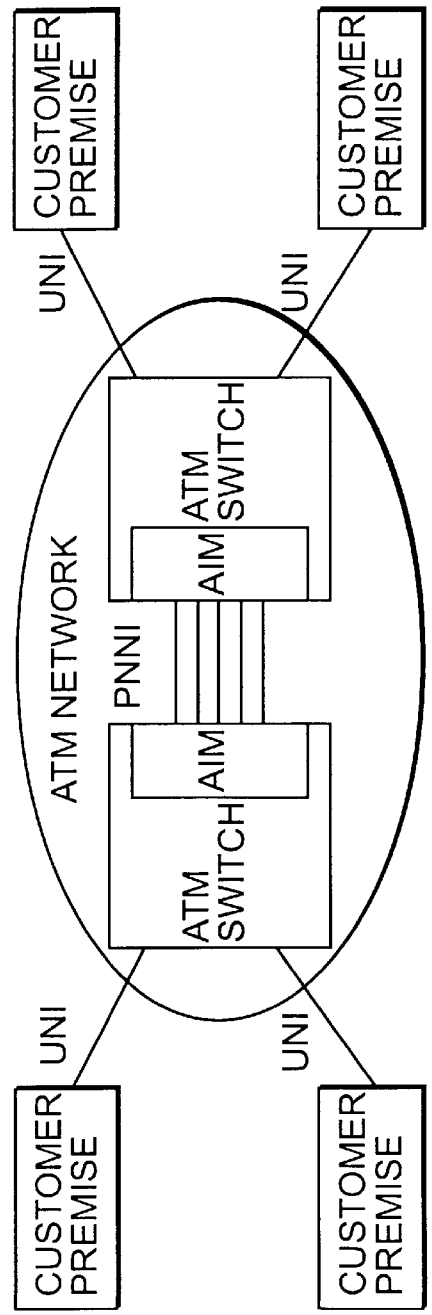
FIG. 2 shows a sample configuration involving AIM BICIs or PNNIs.
Figure 3:
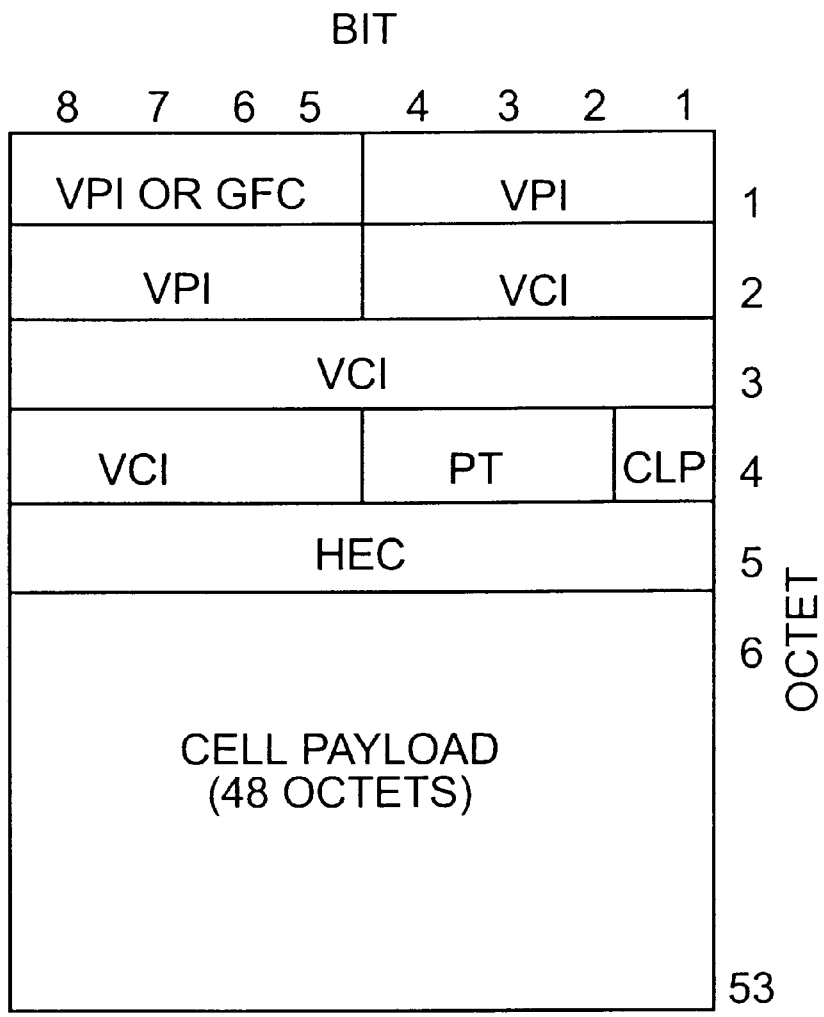
FIG. 3 depicts the ATM cell structure defined in the ITU Recommendation.

The protocol of the invention calls for a physical layer OAM cell that is defined to be exclusively processed by the ATM inverse multiplexers. The new cell structure has to be consistent with the cell structure defined in ITU Recommendation I.361. FIG. 3 shows that structure of UNI/NNI ATM cells that is defined in I.361. ITU Recommendations I.361 and I.432 state that ATM cells consisting of a header whose VPI and VCI fields are set to zero are reserved for use by the physical layer. So far three preassigned values of the cell header are reserved for use by the physical layer. They are shown in FIG. 5.

The physical layer OAM cell according to one embodiment of the invention is then defined by using a non-assigned value by setting the PT field to "111" or some such code. This is shown in FIG. 6.

The AIM OAM cell payload is then available for exchanging information between AIMs. The cell payload consists of a series of fields whose locations are shown in FIG. 7.

The following fields are identified for the AIM protocol according to one embodiment of the invention:

ATM inverse multiplexing remote defect indicator (AIMRDI)—one octet is allocated and the proposed coding is all "1".

ATM inverse multiplexing far-end receiver ready (AIMFERR)—one octet is allocated and the proposed coding is all "1".

ATM inverse multiplexing cell sequence number (AIMCSN)—it is defined to contain the sequence number of the cells sent over the multiple links handled by the ATM inverse multiplexers. It is designed so as to have a sufficiently large cycle to allow the ATM inverse multiplexer to absorb link delays of up to 32 milliseconds. There are 16 bits allocated to the AIMCSN field. The counting is then done modulo 65536.

Cell error control (CEC)—is used to detect errors in the cell payload. It is proposed to CRC-10 as proposed in ITU Recommendation I.432.

Reserve field (R)—contains the octet pattern of "01101010", which is the same as that of the idle cell as proposed in ITU Recommendation I.361.

Referring to FIG. 8, the ATM inverse multiplexing protocol according to one embodiment is described in detail below. The figure only shows one direction for clarity. It is shown that transmission links are all T1/E1 links but, of course, links can have a different speed from T1/E1, as long as all the links have the same speed. A transmitting node 20 collects digital data consisting of a series of ATM data cells from the ATM layer. An ATM inverse multiplexer (AIM) at the transmitting node spreads over multiple links 24 for transmission to a receiving node 26. An AIM at the receiving node reassembles ATM data cells received from the links in proper order and sends them to the ATM layer.

Link Start-up

Upon connection start-up, AIMs at both nodes start inserting AIM OAM cells (AIM SN cells) carrying cell sequence number over the available links in round robin fashion. The sequencing of cells is based on the order in which cells have to be transmitted on the virtual link (composed of N physical links). However, the sequence number is only carried over the SN cells. This sequence number assignment allows the receiving AIM to retrieve the original cell sequence. The receiving node queues the received AIM SN cells until it determines the sequence in which to read the ATM data cells from the incoming links as well as the differential delay among individual links. Then, it starts sending AIM SN cells of its own, with the AIMFERR field set to "one" for each link which is now considered "ready" to receive ATM traffic. From that moment, the receiving node knows the sequence of cells coming from the links. A link is being considered available if cells are currently delineated and AIM-RDI is not received on the incoming link.

When the transmitting node starts sending the AIM SN cells, it starts a time-out of 100 milliseconds within which the receiving node determines the sequence of AIM SN cells which it is receiving from the links. The time-out expires unless the transmitting node receives the "ready" signal from all the links which were considered available at the initialization.

If there is no "ready" link when the time-out expires, the local node reevaluates the availability of the links (using cell delineation), starts sending AIM SN cells over the available links and re-starts the time-out This procedure is repeated until at least one available link is declared ready.

When the time-out has been cancelled due to the reception of the "ready" signal from all the available links, or when there is at least one link ready when the time-out expires, the local end starts sending ATM layer cells over the "ready"

link or links using the same round robin order used at the time of initialization.

Each ATM layer cell gets a sequence number assigned to it, but only the AIM SN cells carry that number across the links. After both nodes have started sending ATM layer cells, they periodically send a series of "n" AIM SN cells over links to allow the receiving node to readjust the differential delays among the links. The value of "n" is equal to the number of "ready" links used to carry AIM layer cells. This means that the receiving node always scans for AIM SN cells in order to determine if it is always reading cells from the multiple links in the correct order. How often a burst of "n" AIM SN cells is sent depends upon the link utilization but the maximum period has been set to 50 milliseconds in one embodiment. An example of cells sent over a virtual link composed of a plurality of transmission links is shown in FIG. 9.

Link Reconfiguration

As mentioned above, the protocol according to the invention also deals with link reconfiguration. There are three possible cases in which reconfiguration can occur:

- a new link has to be added to the round robin;
- a link has to be intentionally removed from the round robin; and
- a link has been declared inadequate to provide service (e.g. link down by failure etc.).

In the first two cases, a node starts link reconfiguration by performing the same initialization process for a connection start-up, that is to say, it chooses a round robin order among the links and starts sending AIM SN cells using the chosen round robin order. The receiving node, seeing the occurrence of AIM SN cells, will stop transmitting traffic and starts sending AIM SN cells of its own while adjusting itself to receive traffic from the incoming links. The rest of the protocol is as described earlier for start-up.

Two possible cases for reporting failure conditions are:

1) A medium problem reported through Loss of Delineation (LCD) failure condition. In this case, the corresponding link should not be used for service. When detecting LCD, SN cells with AIMRDI set to "1" should be sent over the corresponding outgoing link. SN cells containing AIM-RDI do not carry a valid sequence number. At the far end, the detection of AIM-RDI signals will indicate that the link is not to be used. Therefore, if LCD or AIM-RDI is detected, the link is no longer considered available and won't be allowed to be part of the round robin on both sides. When this has happens, SN cells are re-sent over the remaining links to reestablish the connection between the two ends.

2) Cells are lost without an LCD or AIM-RDI being reported. For instance, this would occur when a few cells are discarded by the physical layer device due to bit errors in cell headers. This would cause the cell sequencing to be affected. One symptom would be the detection of SN cells whose number is no longer the same as that expected (since one or more of the previous cells are missing). In this case, the problem might be partially corrected by re-adjusting the receiver buffering system (assuming the difference between the SN cell number and the expected number is small). The other symptom would be the absence of a SN cell on one link when getting a burst of SN cells on all the other links. In that case, the local end would have to force the links to be re-configured. If the symptoms described above reoccur over a given period, the bad link may have to be removed from the round robin.

A link reconfiguration also occurs when it takes too much time for one link to receive cells from the far-end (receiving) node, that is to say, no cells within, e.g., 32 milliseconds.

Cell Sequence Number Range

Because an ATM inverse multiplexer must absorb a differential delay between individual links of up to 32 milliseconds in one embodiment, and because the system needs to deal with a maximum of 8 T1/E1 links, it is necessary to have a sequence number whose modulo is large enough to accommodate such delay.

As a practical example, the following parameters for E1 are considered:

full rates: 2.048 Mbit/s payload rates: 30/32*2.048 Mbit/s=1.92 Mbps

ATM cell: 53 bytes

ATM cell period time: 221 microseconds

ATM cells/32 milliseconds=144 cells.

For a delay of up to 32 milliseconds on each link, there is a need to queue cells for at least the same length of time on each link. Therefore, in this example, this means that a delay of up to a period of 144 cells between two links is possible. An ATM inverse multiplexer can handle a maximum of 8 T1/E1 links. Therefore up to 1008 cells (144*7 cells) must be queued at one time by one ATM inverse multiplexer. This requires a sequence number modulo large enough to cover this scenario. A simple case in one embodiment is to use a 16-bit count that has modulo 65536.

The ATM inverse multiplexing protocol according to the invention realizes the following characteristics:

- it is applicable to UNIs, BICIs and PNNIs (any applicable points in an ATM network);
- it does not affect the ATM cell header of currently defined cells;
- it does not require a change to current ATM physical layer devices dealing with the convergence of ATM cells into T1/E1;
- it operates transparently to the ATM layer;
- it does not require a change to current devices dealing with the processing of the ATM layer cell;
- it is self-configuring among available links upon start-up and self-reconfiguring among the multiple links in the case when a new link has to be added, deleted or considered inadequate to provide service; and
- it includes a sequence number whose modulo is large enough to meet the requirement of a large differential delay among the links.

Figure 11:
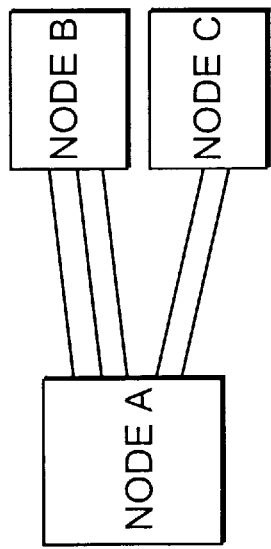
FIG. 11 shows a circumstance where node A may be using a group of three links to send data to node B and another group of two links to send data to node C.
Figure 12:
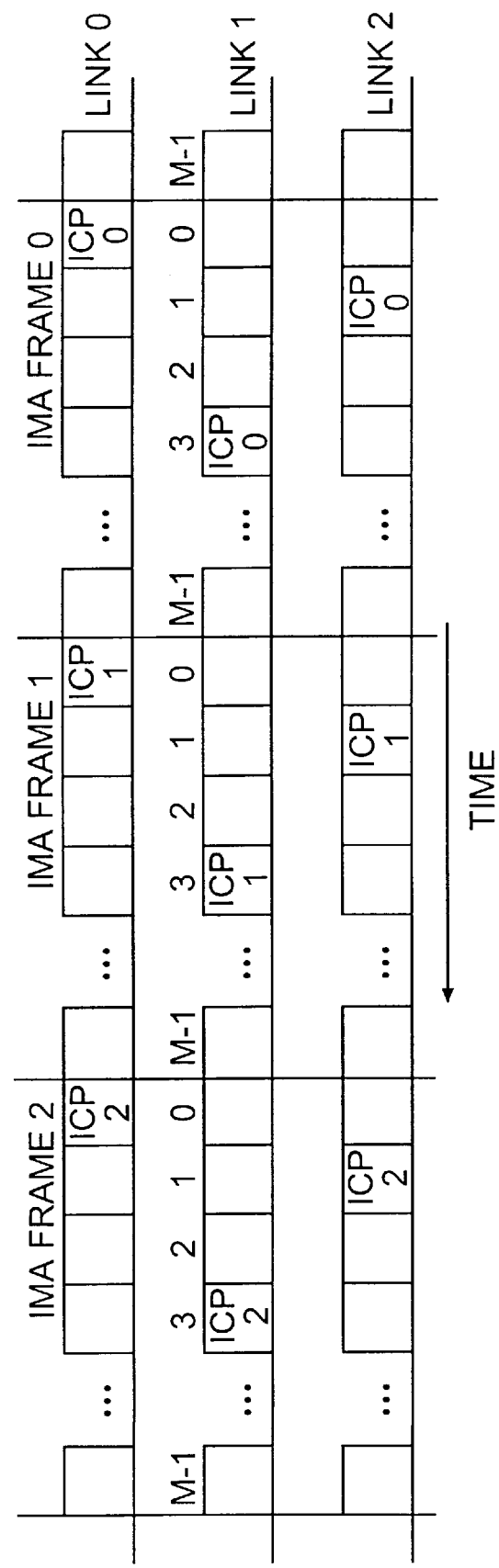
FIG. 12 shows a typical sequence of cells on a three link group.

An embodiment of the present invention, involves special Inverse mux Controller Processor (ICP) cells, which are more detailed versions of the SN cells. The ICP cell format is shown in FIG. 10. In this embodiment, ATM cells are transmitted over an N number of links, N being a positive integer. Cell ID is set for ICP cell and Link ID identifies links being used. As seen in FIG. 11, a node A may be using a group of three links to send data to node B and another group of two links to send data to node C. Nodes A and B form one IMA group and nodes A and C form another. IMA groups are identified by IMA ID (Tx and Rx IMA ID). ATM cells on each link are grouped in a certain number (e.g., M) of cells to form IMA frames which belong to substantially same time scale. An IMA frame sequence number field counts cells in each group. FIG. 12 shows a typical sequence of cells on a three link group. One ICP cell is sent at a set location in each group for each link. M can be any number, for example 32, 64, 128 and 256. In the figure, on link 0, the ICP cells have their cell offset set to zero (i.e., they are the first cell in the IMA frame). On link 1, the ICP cells have the ICP cell offset set to 3 and on link 2, the ICP cells have their ICP cell offset set to 1. In practice, these ICP cells should be distributed even more over the IMA frame but are shown closer for ease of illustration. The ICP cell also includes fields concerning with stuffing action and test control action, both of which will be described in detail below.

A status and control change indication field is used to indicate an update of the link status field value. The value is incremented to indicate a change on at least one of the link status fields. The field is also used as a tag to differentiate link status changes over time. The field will always remain set to the same value as long as there will be no change on any link status fields. If one or more link status fields need to be modified, ICP cells with new link status values incremented will be sent over all the links.

Figure 13A:
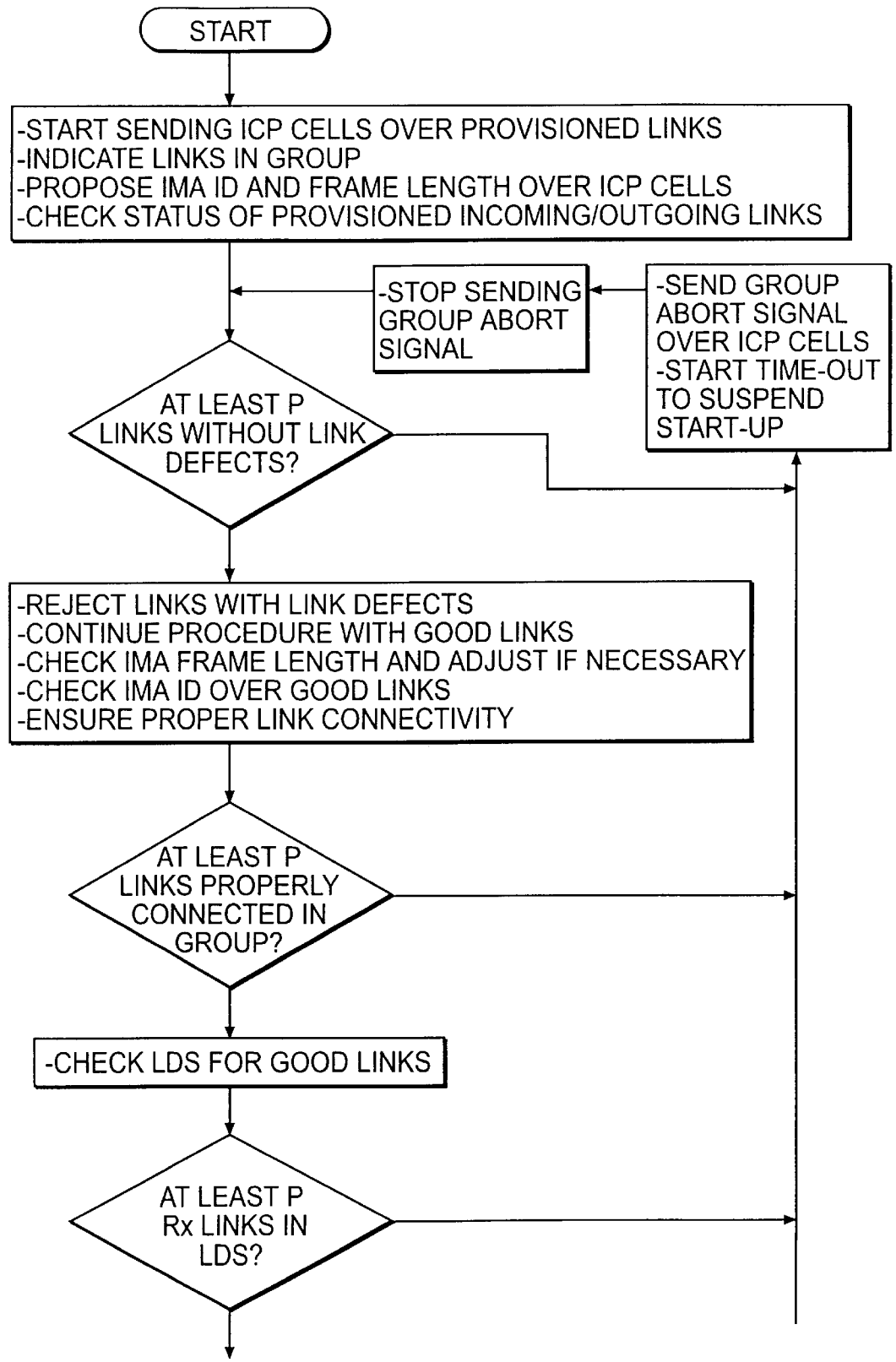
FIGS. 13a and 13b show an algorithmic flow chart for the start-up procedure according to one embodiment.
Figure 13B:
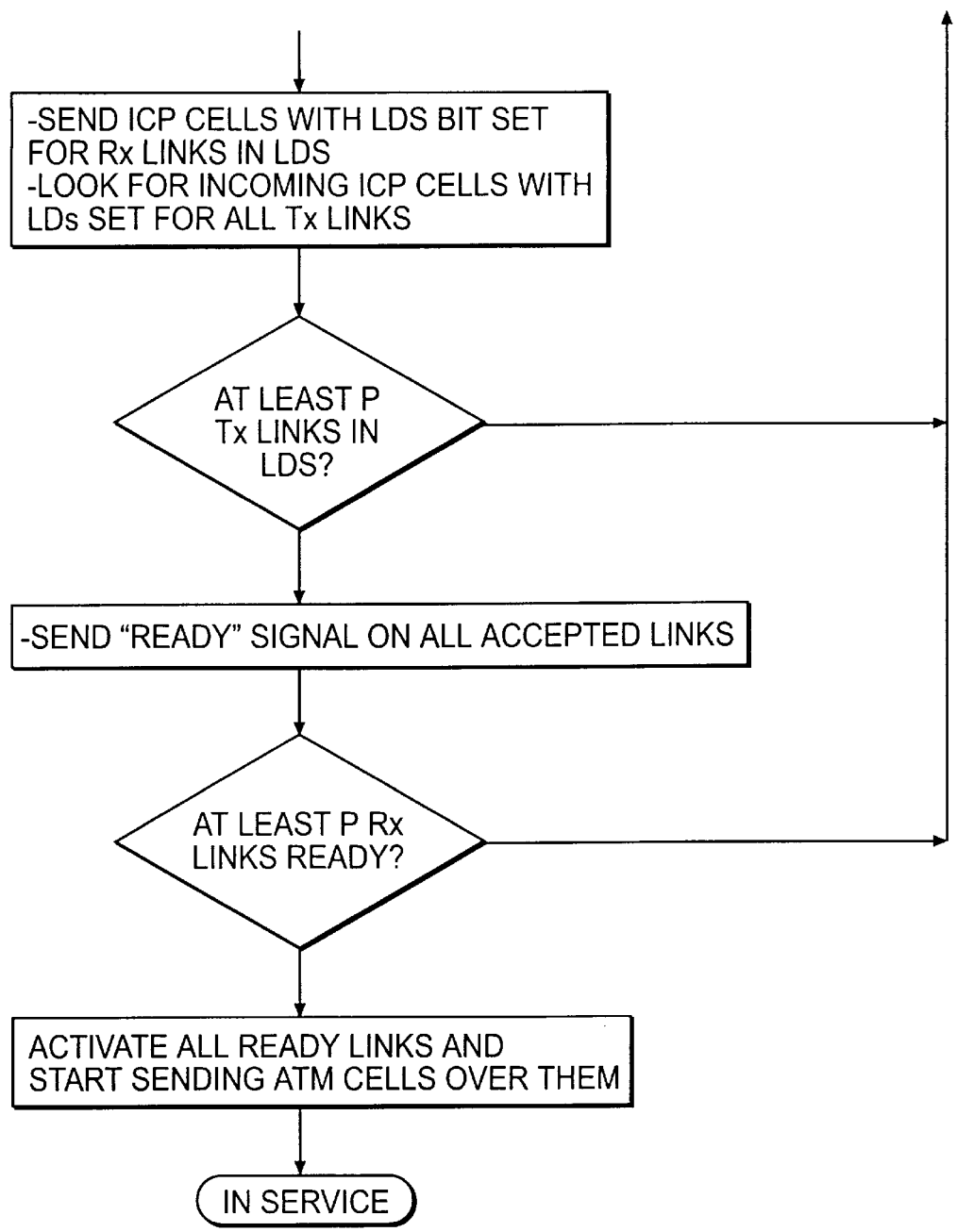
Figure 14:
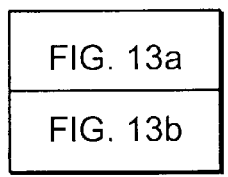
FIG. 14 indicates how FIGS. 13a and 13b should be connected.

A group status and control field is used to indicate status of the group of links at a connection start-up, link addition and abort procedures. In particular, the start-up procedure would become complicated if one of the links does not meet all the criteria to be part of the group (e.g. link cleared of defects, corresponding incoming/outgoing links in loss of delay synchronization). This requires intervention of the operator to remove the bad link(s) from the link group. FIGS. 13a and 13b as combined in the way shown in FIG. 14 show an algorithmic flow chart for the start-up procedure according to one embodiment. Instead of requiring all N number of links in the group being good before starting up, the procedure of the invention proceeds as long as there is at least P out of N "good" link available for service. A good link is defined as a link that is not exhibiting link and loss-of-frame defects, recognized as being part of the group, and having an acceptable link differential delay. The value of P could be any number less than N. The figure also shows cases where the group start-up is aborted and later resumed.

Figure 15:
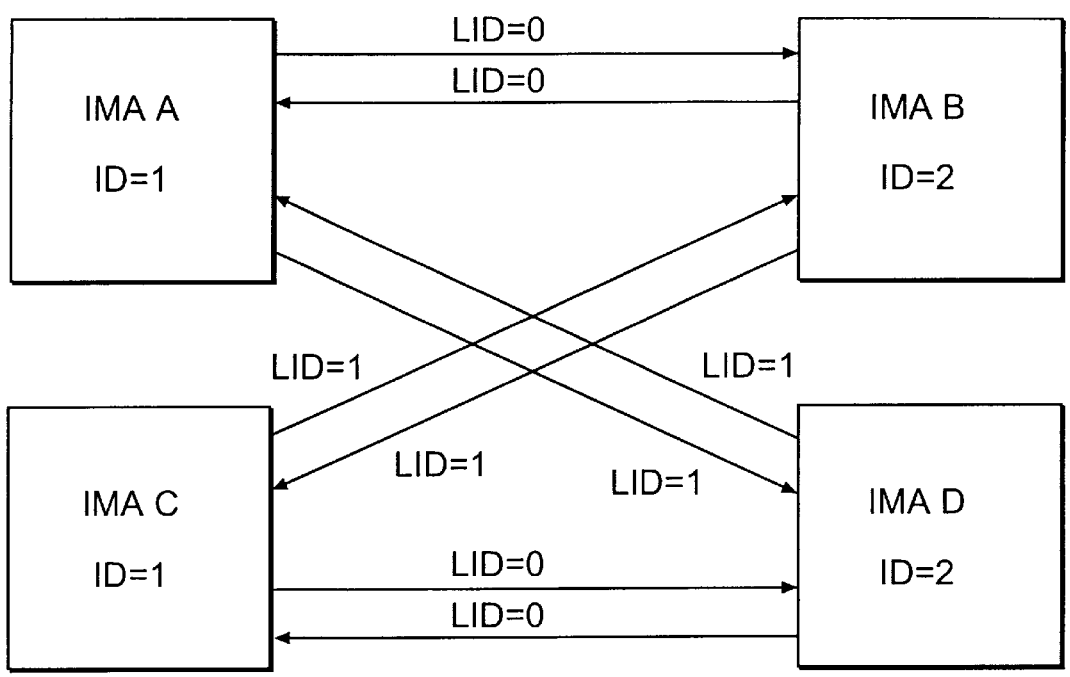
FIG. 15 shows a configuration when links with Link ID=1 are added to groups with active Link ID=0 links.

The ICP format also includes a field for link's connectivity testing at the time of start-up, link addition or link re-activation. In particular, a protocol must always ensure proper connectivity of the links which belong to a group. For example, FIG. 15 shows when links with Link ID=1 are added to groups with active Link ID=0 links. Two new links (Link ID=1 links) are inversely connected with respect to the expected configuration. The difficulty is then that both Link ID and IMA ID are the same for two independent IMAs. This can cause an invalid configuration which will not be detected. This kind of problem can occur at a start-up, link addition or even at a link re-activation. For example, it is possible to reactivate a link which has exhibited a link failure since it has been accidentally inverted with another link with or without the same Link ID and IMA ID. IMA ID is also used to detect loopback situations. This problem occurs when both end nodes of the IMA virtual link wants to use the same IMA ID. The invention addresses this problem also.

According to a further embodiment, the above problems are solved by sending a test pattern contained in ICP cells over a link to be validated. The test pattern will be looped back over all the other links in the group at the far end node. This ensures that the tested link is connected to the same end node as the other links.

Figure 16:
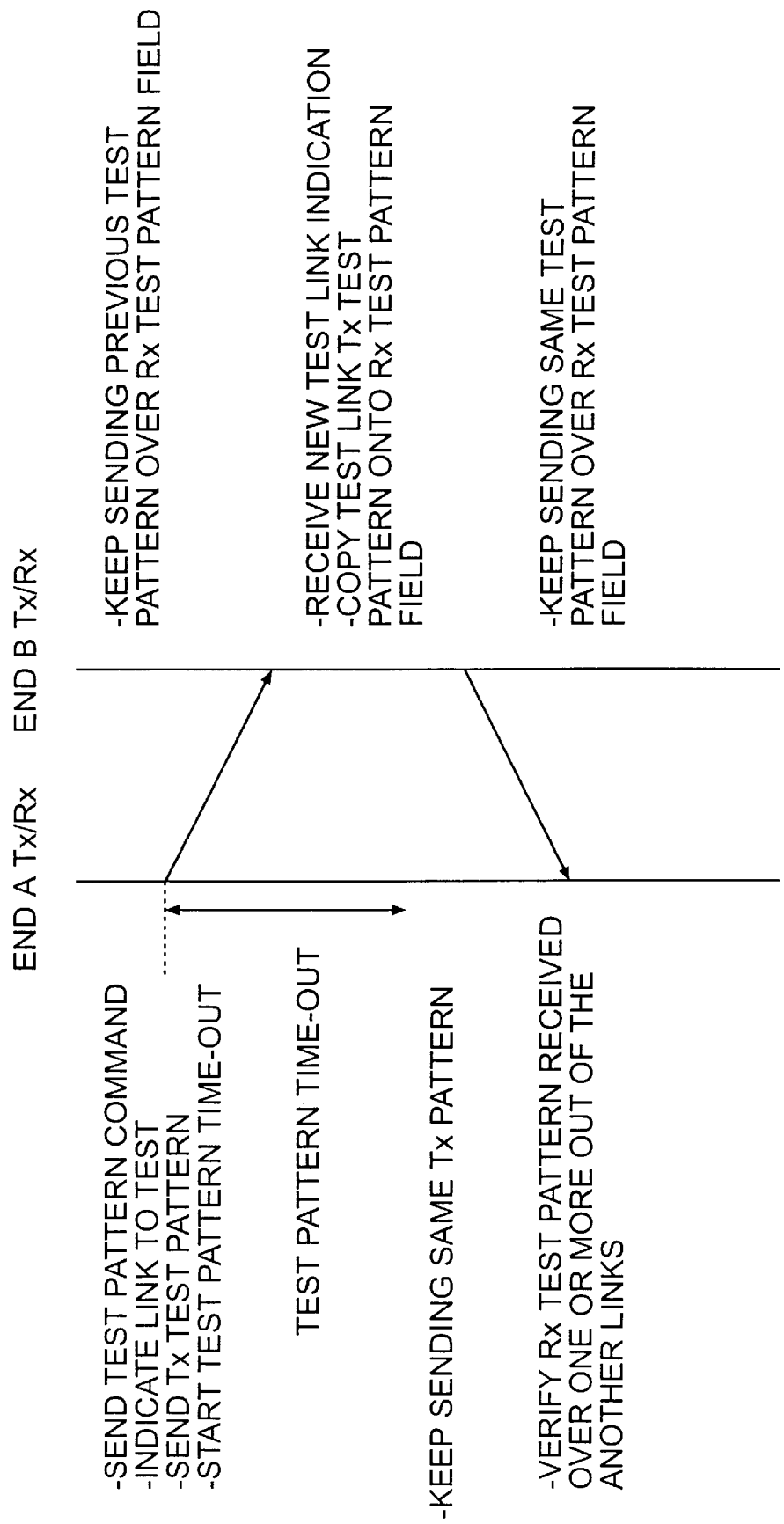
FIG. 16 shows the timing diagram of the test procedure of the invention.
Figure 17:
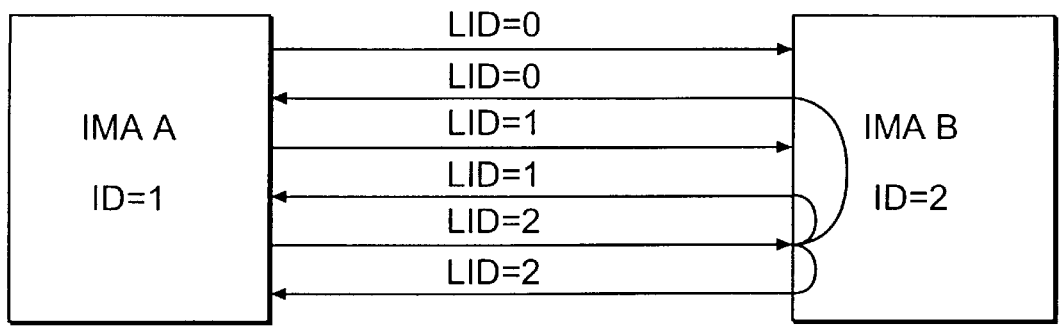
FIG. 17 illustrates looping of a test pattern at node B.

When one IMA node wants to determine if one or more links are connected to the same far end IMA node, it selects one link for testing. FIG. 16 shows the timing diagram of the test procedure of the invention. The transmit node sets the Tx Test control field for link test in an ICP cell. It identifies Link ID, Tx IMA ID, Rx IMA ID and inserts Test Pattern in the cell. It continues to send same ICPs. The receive end node receives the ICPs and copies Tx Test Pattern onto Rx Test Pattern. It keeps sending same test pattern copied on Rx Test Pattern field over its all outgoing links. FIG. 17 illustrates looping of a test pattern at node B. The transmit node receives and verifies Rx Test Pattern returned over the other links. It now knows that all the links which belong to the same IMA group.

Figure 18:
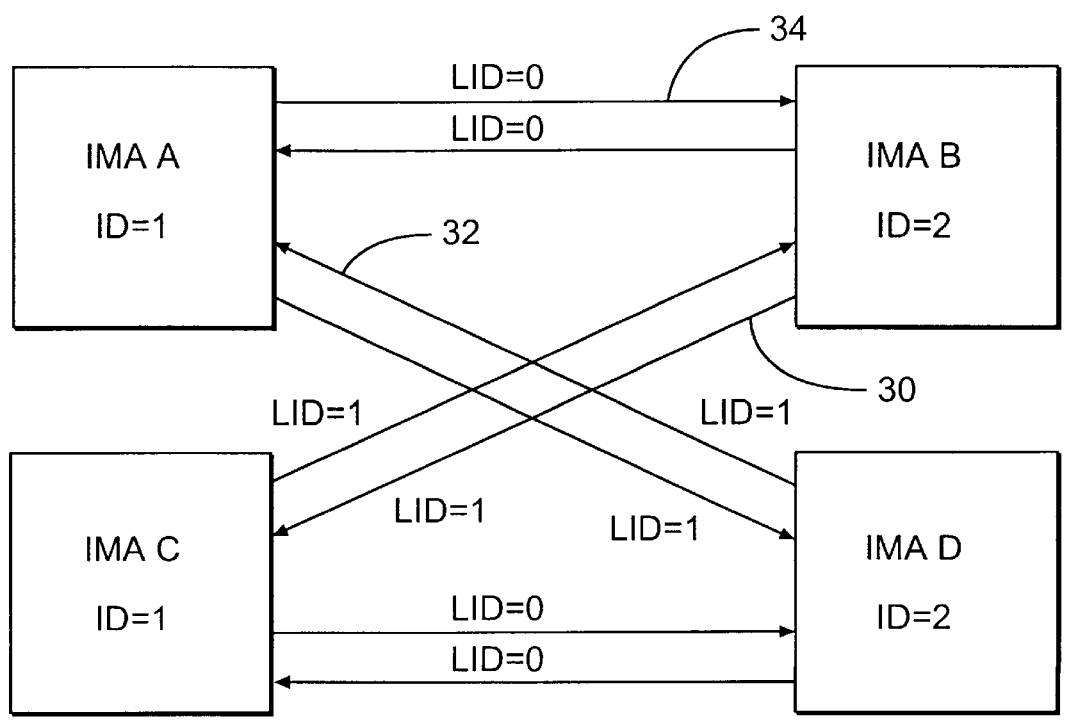
FIG. 18 depicts diagrammatically a scenario where the test pattern procedure can be used to detect a link that is not connected to the expected IMA.

FIG. 18 depicts diagrammatically a scenario where the test pattern procedure can be used to detect a link that is not connected to the expected IMA. Links identified as Link ID=1 are being added to existing groups using links with Link ID=0. Link 30 carries the IMA B Test Pattern to looped back by IMA A and links 32 and 34 carry the IMA D Test Pattern to be looped back to IMA B. In this case, the wrong test pattern will be received by IMA B. If IMA B was not commanding a Test Pattern loopback, IMA B would simply not receive the right test pattern.

The Test Pattern procedure also allows to deal with some pathological cases. One of them is when two IMA connected to the same far end IMA node are trying to start-up at the same time. The far end (receive end) node will have to determine which set of links (corresponding to one end) it wants to be connected to. This will require the received end to select the link(s) to be part of the group, as mentioned above, the receive end shall only respond to one Test Pattern command at a time that has been validated over one or more links that are or likely to be recognized as part of the group.

In accordance with a further embodiment, a stuff cell is inserted to control cell rate decoupling between the links, in order to accommodate the use of links non-synchronized to each other within the link groups. The transmitting node may be locked to one clock source or may be plesiochronous. When plesiochronous, one of the buffers at the transmitting node may be depleted. To prevent underrun, the cell stuffing procedure is invoked. When there is one clock source, the buffer will never deplete. The transmitting node send ICP cells which indicate a cell is stuffed at a certain location within the IMA frame. Any cell can be used for stuffing as long as the location is indicated so that the receiving node can remove it. In actual embodiment, the transmitting node repeats the ICP cell containing the stuff code indicating that "this cell is 1 out of 2 stuff cells". The receiving node uses the stuff indications over the ICP cells to determine when to remove stuff cells from the incoming cell stream. The receiving node relies on at least one ICP cell with a correct CRC-10. A more robust approach is to look for a majority of valid codes.

Figure 19:
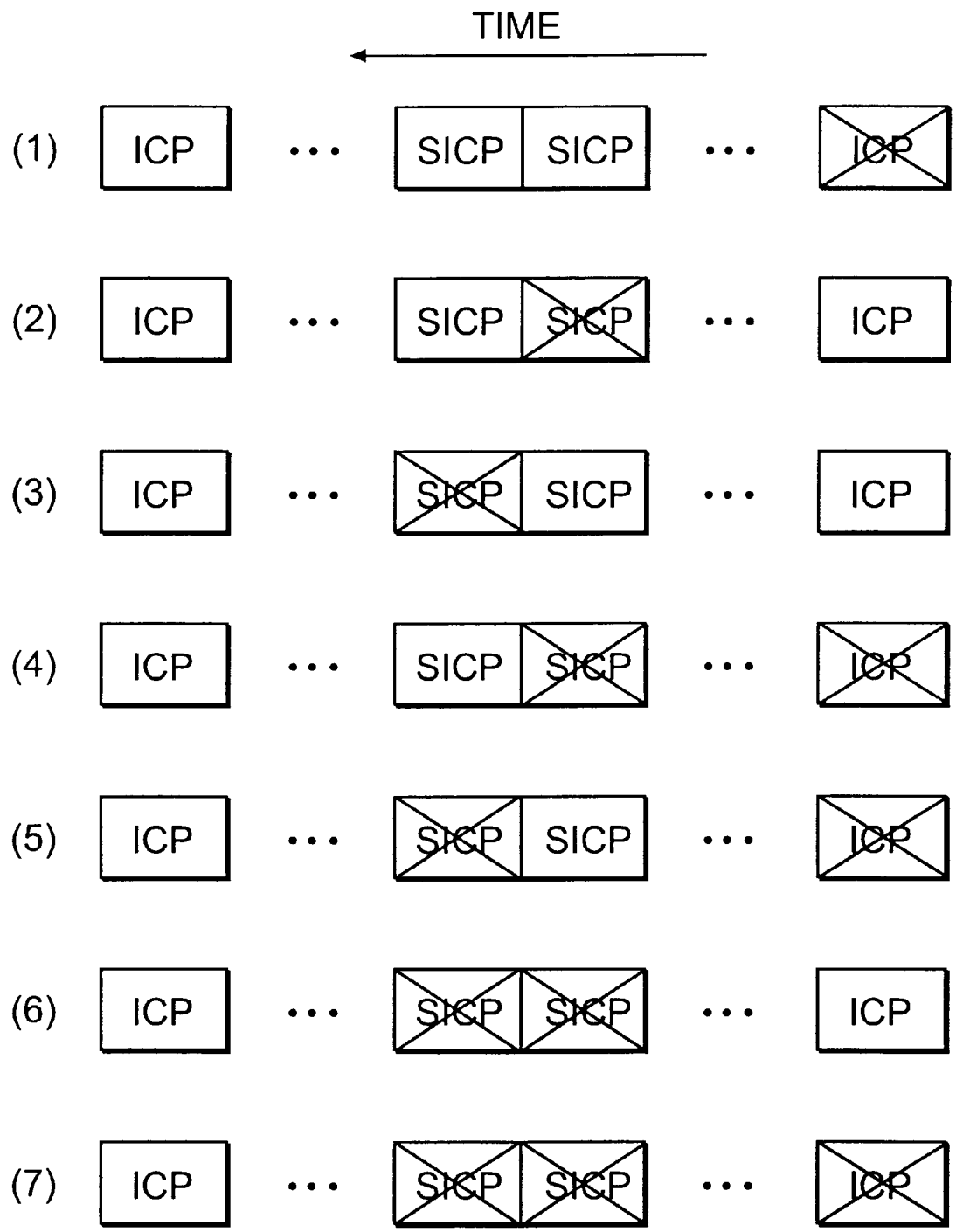
FIG. 19 shows cases (1, . . . , 7) when the ICP cell preceding the stuff event and the stuff ICP cells are corrupted.

FIG. 19 shows cases (1, ... , 7) when the ICP cell preceding the stuff event and the stuff ICP cells are corrupted. Corrupted cells are indicated by crosses in the figure. SICP indicate stuffing control cells. The receiving node maintains synchronization for cases 1, 2, and 3. The receiving node optionally maintain synchronization for cases 4, 5, and 6. The receiving node optionally maintain synchronization for case 7 if b>2 and when passing stuff indication over more than one of the previous ICP cells. "b" is the number of invalid/corrupted ICP cells before declaring the link OIF (out-of-IMA frame).

What is claimed is:

1. A method of inverse multiplexing digital data over a connection consisting of a plurality of transmission links, said data containing a series of ATM data cells, comprising steps of:

sending a series of inverse multiplexing control cells indicating a specific round robin order in which the series of ATM data cells are to be transmitted over the connection;

receiving from the plurality of transmission links a series of inverse multiplexing control cells whose receive ready field is set;

sending each ATM data cell in said series of ATM data cells in said specific round robin order; and further sending two consecutive inverse multiplexing control cells in a frame, indicating cell stuffing.

2. The method of claim 1, wherein the inverse multiplexing control cells include stuff code indicating the location and sequence of stuff cells inserted in the frame.

3. A method of inverse multiplexing digital data over a connection having a plurality of transmission links, the data containing a series of ATM data cells that is segmented into a plurality of frames, the method comprising:

transmitting from a first node a series of inverse multiplexing control cells indicating a round robin order in which the ATM data cells are to be transmitted over the connection;

receiving at the first node a series of inverse multiplexing control cells whose receive ready field is set;

transmitting from the first node the series of ATM data cells in the round robin order, the first node inserting at least one inverse multiplexing control cell that contains cell stuff information into each frame.

4. The method of claim 3, wherein the cell stuff information includes stuff code indicating the location of stuff cells inserted in a respective frame.

5. The method of claim 4, wherein the stuff code further indicates that a stuff cell is one out of two stuff cells inserted in the respective frame.

6. A method of establishing a communication link for inverse multiplexing digital data from a source node to a destination node over a connection including a plurality of transmission links, the data containing a series of ATM data cells that is segmented into a plurality of frames, comprising:

initiating the connection by transmitting from the source node one or more inverse multiplexing control cells containing information defining a round robin order in which the series of ATM data cells are to be transmitted over the connection;

receiving at the source node one or more inverse multiplexing control cells containing information indicating that the destination node is ready to receive ATM data cells in the round robin order over the connection; and sending the series of ATM data cells in the round robin order to the destination node, wherein each frame includes at least one inverse multiplexing control cell that contains cell stuff information.

7. The method of claim 6, wherein the cell stuff information includes stuff code indicating the location of stuff cells inserted in a respective frame.

8. The method of claim 7, wherein the stuff code further indicates that a stuff cell is one out of two stuff cells inserted in the respective frame.

9. A method of inverse multiplexing digital data from a source node to a destination node over a connection including a plurality of transmission links, the data including a series of ATM data cells that is segmented into a plurality of frames, comprising:

initiating the connection between the source node and the destination node by transmitting from the source node one or more inverse multiplexing control cells containing information defining a round robin order in which the series of ATM data cells are to be transmitted over the connection;

receiving at the source node one or more inverse multiplexing control cells containing information indicating that the destination node is ready to receive ATM data cells in the round robin order over the connection; and transmitting the series of ATM data cells to the destination node in the round robin order, wherein each frame includes at least one inverse multiplexing control cell that contains cell stuff information.

10. The method of claim 9, wherein the cell stuff information includes stuff code indicating the location of stuff cells inserted in a respective frame.

11. The method of claim 10, wherein the stuff code further indicates that a stuff cell is one out of two stuff cells inserted in the respective frame.

12. A method of inverse multiplexing digital data to be transmitted from a source node to a destination node using a plurality of communication links, comprising the steps of:

transmitting from the source node to the destination node one or more inverse multiplexing control cells including information identifying a specific order in which a series of ATM data cells that is segmented into a plurality of frames are to be transmitted over the plurality of communication links;

transmitting from the destination node to the source node one or more inverse multiplexing control cells including information indicating that the destination node is ready to receive ATM data cells in the specific order; and transmitting from the source node to the destination node the series of ATM data cells in the specific order, wherein each frame includes at least one inverse multiplexing control cell that contains cell stuff information.

13. The method of claim 12, wherein the cell stuff information includes stuff code indicating the location of stuff cells inserted in a respective frame.

14. The method of claim 13, wherein the stuff code further indicates that a stuff cell is one out of two stuff cells inserted in the respective frame.

15. A method at a source node of inverse multiplexing digital data to be transmitted from the source node to a destination node using a plurality of communication links, comprising:

transmitting from the source node to the destination node one or more inverse multiplexing control cells including information identifying an order in which a series of ATM data cells that is segmented into a plurality of frames are to be transmitted over the plurality of communication links;

receiving at the source node transmitted from the destination node one or more inverse multiplexing control cells including information indicating that the destination node is ready to receive ATM data cells in the specified order; and transmitting from the source node to the destination node the series of ATM data cells in the specified order, wherein each frame includes at least one inverse multiplexing control cell that contains cell stuff information.

16. The method of claim 15, wherein the cell stuff information includes stuff code indicating the location of stuff cells inserted in a respective frame.

17. The method of claim 16, wherein the stuff code further indicates that a stuff cell is one out of two stuff cells inserted in the respective frame.

18. A method, for use at a destination node, of receiving inverse multiplexed digital data transmitted from a source node using a plurality of communication links, comprising:

receiving from the source node, one or more inverse multiplexing control cells including information identifying an order in which a series of ATM data cells that is segmented into a plurality of frames are to be transmitted over the plurality of communication links;

transmitting one or more inverse multiplexing control cells including information indicating that the destination node is ready to receive ATM data cells in the order;

receiving the series of ATM data cells transmitted from the source node in the order; wherein each frame includes at least one inverse multiplexing control cell that contains cell stuff information.

19. The method of claim 18, wherein the cell stuff information includes stuff code indicating the location of stuff cells inserted in a respective frame.

20. The method of claim 19, wherein the stuff code further indicates that a stuff cell is one out of two stuff cells inserted in the respective frame.

21. A method of inverse multiplexing digital data from a source node to a destination node over a connection including a plurality of transmission links, the data containing a series of ATM data cells that is segmented into a plurality of frames, comprising:

the source node sending to the destination node one or more inverse multiplexing control cells informing the destination node of a round robin order in which the series of ATM data cells are to be transmitted over the connection;

the destination node sending one or more inverse multiplexing control cells including information indicating that the destination node is ready to receive ATM data cells in the round robin order from the plurality of transmission links; and the source node sending the series of ATM data cells to the destination node in the round robin order, wherein each frame includes at least one inverse multiplexing control cell that contains cell stuff information.

22. The method of claim 21, wherein the cell stuff information includes stuff code indicating the location of stuff cells inserted in a respective frame.

23. The method of claim 22, wherein the stuff code further indicates that a stuff cell is one out of two stuff cells inserted in the respective frame.

24. A method of inverse multiplexing digital data over a connection including a plurality of transmission links, the data containing a series of ATM data cells that is segmented into a plurality of frames, comprising:

sending to a destination node one or more inverse multiplexing control cells indicating a specific round robin order in which the series of ATM data cells are to be transmitted over the connection;

receiving from the destination node one or more inverse multiplexing control cells including information indicating that the destination node is ready to receive ATM data cells;

sending the series of ATM data cells to the destination node in the specific round robin order, wherein each frame includes at least one inverse multiplexing control cell that contain cell stuff information.

25. The method of claim 24, wherein the cell stuff information includes stuff code indicating the location of stuff cells inserted in a respective frame.

26. The method of claim 25, wherein the stuff code further indicates that a stuff cell is one out of two staff cells inserted in the respective frame.

27. A method of inverse multiplexing digital data over a connection including a plurality of transmission links, the data containing a series of ATM data cells that is segmented into a plurality of frames, comprising receiving at a destination node from a source node one or more inverse multiplexing control cells indicating a specific round robin order in which the series of ATM data cells are to be transmitted over the connection;

transmitting from the destination node to the source node one or more inverse multiplexing control cells including information indicating that the destination node is ready to receive ATM data cells;

receiving the series of ATM data cells at the destination node in the specific round robin order, wherein each frame includes at least one inverse multiplexing control cell that contains cell stuff information.

28. The method of claim 27, wherein the cell stuff information includes stuff code indicating the location of stuff cells inserted in a respective frame.

29. The method of claim 28, wherein the stuff code further indicates that a stuff cell is one out of two stuff cells inserted in the respective frame.

30. A method of inverse multiplexing digital data from a first node to a second node over a connection consisting of a plurality of transmission links, the data containing a series of ATM data cells that is segmented into a plurality of frames, comprising:

whenever the connection is to be reconfigured, the first node sending to the second node one or more inverse multiplexing control cells containing information indicating a specific round robin order in which the series of ATM data cells are to be transmitted over the connection;

receiving at the first node from the second node, one or more inverse multiplexing control cells containing information indicating that the second node is ready to receive ATM data cells in the specific round robin order from the plurality of transmission links;

sending each ATM data cell in the series of ATM data cells from the first node to the second node in the specific round robin order, wherein each frame includes at least one inverse multiplexing control cell that contains cell stuff information.

31. The method of claim 30, wherein the cell stuff information includes stuff code indicating the location of stuff cells inserted in a respective frame.

32. The method of claim 31, wherein the stuff code further indicates that a stuff cell is one out of two stuff cells inserted in the respective frame.

33. A method of inverse multiplexing digital data from a first node to a second node over a connection consisting of a plurality of transmission links, the data containing a series of ATM data cells that is segmented into a plurality of frames, comprising:

whenever the connection is to be reconfigured, the second node receiving from the first node one or more inverse multiplexing control cells containing information indicating a specific round robin order in which the series of ATM data cells are to be transmitted over the connection;

sending from the second node to the first node, one or more inverse multiplexing control cells containing information indicating that the second node is ready to receive ATM data cells in the specific round robin order from the plurality of transmission links;

receiving at the second node each ATM data cell in the series of ATM data cells from the first node in the specific round robin order, wherein each frame includes at least one inverse multiplexing control cell that contains cell stuff information.

34. The method of claim 33, wherein the cell stuff information includes stuff code indicating the location of stuff cells inserted in a respective frame.

35. The method of claim 34, wherein the stuff code further indicates that a stuff cell is one out of two stuff cells inserted in the respective frame.

36. A node in an ATM communications system for inverse multiplexing digital data from a source node to a destination node over a connection including a plurality of transmission links, comprising:
- a transmitting device for transmitting from the source node one or more inverse multiplexing control cells containing information defining a round robin order in which a series of ATM data cells that is segmented into a plurality of frames are to be transmitted over the connection;
- a receiving device for receiving at the source node, inverse multiplexing control cells containing information indicating that the destination node is ready to receive ATM data cells in the round robin order from the plurality of transmission links; and
- a data cell transmitting device for transmitting to the receiving node, the series of ATM data cells in the round robin order, wherein each frame includes at least one inverse multiplexing control cell that contains cell stuff information.

37. The node of claim 36, wherein the cell stuff information includes stuff code indicating the location of stuff cells inserted in a respective frame.

38. The node of claim 37, wherein the stuff code further indicates that a stuff cell is one out of two stuff cells inserted in the respective frame.

39. A node in an ATM communications system for inverse multiplexing digital data from a source node to a destination node over a connection including a plurality of transmission links, the data including a series of ATM data cells that is segmented into a plurality of frames, comprising:
- a transmitting device that transmits from the source node one or more inverse multiplexing control cells containing information defining a round robin order in which the series of ATM data cells are to be transmitted over the connection;
- a receiving device for receiving at the source node, one or more inverse multiplexing control cells containing information indicating that the destination node is ready to receive ATM data cells in the round robin order from the plurality of transmission links; and
- a data cell transmitting device for transmitting the series of ATM data cells to the destination node in the round robin order, wherein each frame includes at least one inverse multiplexing control cell that contains cell stuff information.

40. The node of claim 39, wherein the cell stuff information includes stuff code indicating the location of stuff cells inserted in a respective frame.

41. The node of claim 40, wherein the stuff code further indicates that a stuff cell is one out of two stuff cells inserted in the respective frame.

42. A node in an ATM communications system for inverse multiplexing digital data to be transmitted from a source node to a destination node using a plurality of communication links, comprising:
- a transmitting device for transmitting from the source node to the destination node one or more inverse multiplexing control cells including information identifying a specific order in which a series of ATM data cells that is segmented into a plurality of frames are to be transmitted over the plurality of communication links;
- a transmitting device for transmitting from the destination node to the source node one or more inverse multiplexing control cells including information indicating that the destination node is ready to receive ATM data cells in the specific order; and
- a data cell transmitting device for transmitting from the source node to the destination node the series of ATM data cells in the specific order, wherein each frame includes at least one inverse multiplexing control cell that contains cell stuff information.

43. The node of claim 42, wherein the cell stuff information includes stuff code indicating the location of stuff cells inserted in a respective frame.

44. The node of claim 43, wherein the stuff code further indicates that a stuff cell is one out of two stuff cells inserted in the respective frame.

45. A node in an ATM communications system for inverse multiplexing digital data to be transmitted from a source node to a destination node using a plurality of communication links, comprising:
- a transmitting device for transmitting from the source node to the destination node one or more inverse multiplexing control cells including information identifying a specific order in which a series of ATM data cells that is segmented into a plurality of frames are to be transmitted over the plurality of communication links;
- a receiving device for receiving at the source node transmitted from the destination node, one or more inverse multiplexing control cells including information indicating that the destination node is ready to receive ATM data cells in the specific order; and
- a data cell transmitting device for transmitting from the source node to the destination node the series of ATM data cells in the specific order, wherein each frame includes at least one inverse multiplexing control cell that contains cell stuff information.

46. The node of claim 45, wherein the cell stuff information includes stuff code indicating the location of stuff cells inserted in a respective frame.

47. The node of claim 46, wherein the stuff code further indicates that a stuff cell is one out of two stuff cells inserted in the respective frame.

48. A node in an ATM communications system for receiving inverse multiplexed digital data transmitted from a source node to the destination node using a plurality of communication links, comprising:
- a receiving device that receives at the destination node one or more inverse multiplexing control cells transmitted from the source node, wherein the inverse multiplexing control cells include information identifying a specific order in which a series of ATM data cells that is segmented into a plurality of frames are to be transmitted over the plurality of communication links;
- a transmitting device transmitting from the destination node to the source node, one or more inverse multiplexing cells including information indicating that the destination node is ready to receive ATM data cells in the specific order; and
- a data cell receiving device that receives at the destination nodes the serie, of ATM data cells transmitted from the source node in the specific order, wherein each frame includes at least one inverse multiplexing control cell that contains cell stuff information.

49. The node of claim 48, wherein the cell stuff information includes stuff code indicating the location of stuff cells inserted in a respective frame.

50. The node of claim 49, wherein the stuff code further indicates that a stuff cell is one out of two stuff cells inserted in the respective frame.

51. A node in an ATM communications system for inverse multiplexing digital data from a source node to a destination node over a connection including a plurality of transmission links, the data containing a series of ATM data cells that is segmented into a plurality of frames, comprising:

a transmitting device for sending from the source node to the destination node, at a connection start-up, one or more inverse multiplexing control cells informing the destination node of a specific round robin order in which the series of ATM data cells are to be transmitted over the connection;

a transmitting device for sending one or more inverse multiplexing control cells including information indicating that the destination node is ready to receive ATM data cells in the specific round robin order from the plurality of transmission links; and a data cell transmitting device for sending the series of ATM data cells to the destination node in the specific round robin order, wherein each frame includes at least one inverse multiplexing control cell that contains cell stuff information.

52. The node of claim 51, wherein the cell stuff information includes stuff code indicating the location of stuff cells inserted in a respective frame.

53. The node of claim 52, wherein the stuff code further indicates that a stuff cell is one out of two stuff cells inserted in the respective frame.

54. A node in an ATM communications system for inverse multiplexing digital data over a connection including a plurality of transmission links, the data containing a series of ATM data cells that is segmented into a plurality of frames, comprising:

a transmitting device for sending to a destination node one or more inverse multiplexing control cells indicating a specific round robin order in which the series of ATM data cells are to be transmitted over the connection;

a receiving device for receiving from the destination node one or more inverse multiplexing control cells including information indicating that the destination node is ready to receive ATM data cells; and a data cell transmitting device for sending the series of ATM data cells to the destination node in the specific round robin order, wherein each frame includes at least one inverse multiplexing control cell that contains cell stuff information.

55. The node of claim 54, wherein the cell stuff information includes stuff code indicating the location of stuff cells inserted in a respective frame.

56. The node of claim 55, wherein the stuff code further indicates that a stuff cell is one out of two stuff cells inserted in the respective frame.

57. A node in an ATM communication system for inverse multiplexing digital data over a connection including a plurality of transmission links, the data containing a series of ATM data cells that is segmented into a plurality of frames, comprising:

a receiving device for receiving at a destination node from a source node one or more inverse multiplexing control cells indicating a specific round robin order in which the series of ATM data cells are to be transmitted over the connection;

a transmitting device for transmitting from the destination node one or more inverse multiplexing control cells including information indicating that the destination node is ready to receive ATM data cells; and a data cell receiving device for receiving the series of ATM data cells at the destination node in the specific round robin order, wherein each frame includes at least one inverse multiplexing control cell that contains cell stuff information.

58. The node of claim 57, wherein the cell stuff information includes stuff code indicating the location of stuff cells inserted in a respective frame.

59. The node of claim 58, wherein the stuff code further indicates that a stuff cell is one out of two stuff cells inserted in the respective frame.

60. A node in an ATM communication system for inverse multiplexing digital data to another node over a connection consisting of a plurality of transmission links, the data containing a series of ATM data cells that is segmented into a plurality of frames, comprising:

a transmitting device for sending to the other node, whenever the connection is to be reconfigured, one or more inverse multiplexing control cells containing information indicating a specific round robin order in which the series of ATM data cells are to be transmitted over the connection;

a receiving device for receiving from the other node, inverse multiplexing control cells containing information indicating that the other node is ready to receive ATM data cells in the specific round robin order from the plurality of transmission links; and a data cell transmitting device for sending each ATM data cell in the series of ATM data cells to the other node in the specific round robin order, wherein each frame includes at least one inverse multiplexing control cell that contains cell stuff information.

61. The node of claim 60, wherein the cell stuff information includes stuff code indicating the location of stuff cells inserted in a respective frame.

62. The node of claim 61, wherein the stuff code further indicates that a stuff cell is one out of two stuff cells inserted in the respective frame.

63. A node in an ATM communication system for inverse multiplexing digital data to another node over a connection consisting of a plurality of transmission links, the data containing a series of ATM data cells that is segmented into a plurality of frames, comprising:

a receiving device for receiving at the other node, whenever the connection is to be reconfigured, one or more cells containing information indicating a specific round robin order in which the series of ATM data cells are to be transmitted over the connection;

a transmitting device for sending from the other node, inverse multiplexing control cells containing information indicating that the other node is ready to receive ATM data cells in the specific round robin order from the plurality of transmission links; and a receiving device for receiving at the other node each ATM data cell in the series of ATM data cells in the specific round robin order, wherein each frame includes at least one inverse multiplexing control cell that contains cell stuff information.

64. The node of claim 63, wherein the cell stuff information includes stuff code indicating the location of stuff cells inserted in a respective frame.

65. The node of claim 64, wherein the stuff code further indicates that a stuff cell is one out of two stuff cells inserted in the respective frame.

66. A node in an ATM communications system for inverse multiplexing digital data to be transmitted from a source node to a destination node using a plurality of communication links, comprising:

means for transmitting from the source node to the destination node one or more inverse multiplexing control cells including information identifying a specific order in which a series of ATM data cells that is segmented into a plurality of frames are to be transmitted over the plurality of communication links;

means for transmitting from the destination node to the source node one or more inverse multiplexing control cells that include information indicating that the destination node is ready to receive ATM data cells in the specific order;

means for transmitting from the source node to the destination node the series of ATM data cells in the specific order; wherein each frame includes at least one inverse multiplexing control cell that contains cell stuff information.

67. The node of claim 66, wherein the cell stuff information includes stuff code indicating the location of stuff cells inserted in a respective frame.

68. The node of claim 67, wherein the stuff code further indicates that a stuff cell is one out of two stuff cells inserted in the respective frame.

69. A system for inverse multiplexing digital data from one node to another node over a connection, the data containing a series of ATM data cells that is segmented into a plurality of frames, the system comprising:

a plurality of transmission links in communication with the one node;

a transmitting device for transmitting from the one node one or more cells containing information defining a round robin order in which a series of ATM data cells are to be transmitted over the connection;

a receiving device for receiving at the one node cells containing information indicating that the another node is ready to receive ATM data cells in the round robin order from the plurality of transmission links and a data cell transmitting device for transmitting from the one node to the another node, the series of ATM data cells, wherein each frame includes at least one inverse multiplexing control cell that contains cell stuff information.

70. The system of claim 69, wherein the cell stuff information includes stuff code indicating the location of stuff cells inserted in a respective frame.

71. The system of claim 70, wherein the stuff code further indicates that a stuff cell is one out of two stuff cells inserted in the respective frame.

72. A method of inverse multiplexing digital data from a source node to a destination node over a connection consisting of a plurality of transmission links, said data containing a series of ATM data cells that are segmented into a plurality of frames, comprising steps of:

sending, at a connection start-up, from the source node to the destination node, inverse multiplexing control cells informing the latter of a specific round robin order in which the series of ATM data cells are to be transmitted over the connection;

the destination node sending inverse multiplexing control cells whose receive ready field is set to indicate that the destination node is ready to receive ATM data cells in said specific round robin order from the plurality of transmission links; and the source node sending each ATM data cell in said series of ATM data cells that are arranged into a plurality of frames, to the destination node in said specific round robin order, wherein each frame includes at least one inverse multiplexing control cell that contains cell stuff information.

73. The method of claim 72, wherein the cell stuff information includes stuff code indicating the location of stuff cells inserted in a respective frame.

74. The method of claim 73, wherein the stuff code further indicates that a stuff cell is one out of two stuff cells inserted in the respective frame.

* * * * *

UNITED STATES PATENT AND TRADEMARK OFFICE
CERTIFICATE OF CORRECTION

PATENT NO. : 6,205,142 B1
DATED : March 20, 2001
INVENTOR(S) : Richard Vallee

It is certified that error appears in the above-identified patent and that said Letters Patent is hereby corrected as shown below:

Claims:
Column 13,
Line 59, change "contain" to -- contains --.
Line 64, change "staff cells" to -- stuff cells --.

Column 16,
Line 67, change "nodes the serie, of ATM data cells" to -- node, the series of ATM data cells --.

Signed and Sealed this

Twenty-eighth Day of August, 2001

Attest:

NICHOLAS P. GODICI
Attesting Officer       Acting Director of the United States Patent and Trademark Office